(12) United States Patent
Gerligand et al.

(10) Patent No.: US 9,791,716 B2
(45) Date of Patent: *Oct. 17, 2017

(54) METHOD FOR STABILIZING CONTACT LENSES

(71) Applicant: Johnson & Johnson Vision Care, Inc., Jacksonville, FL (US)

(72) Inventors: Pierre Gerligand, Jacksonville, FL (US); Edgar V. Menezes, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/825,270

(22) Filed: Aug. 13, 2015

(65) Prior Publication Data
US 2015/0346514 A1 Dec. 3, 2015

Related U.S. Application Data

(62) Division of application No. 13/910,332, filed on Jun. 5, 2013, now Pat. No. 9,134,545, which is a division of application No. 12/641,116, filed on Dec. 17, 2009, now Pat. No. 8,480,229.

(51) Int. Cl.
G02C 7/02 (2006.01)
G02C 7/04 (2006.01)

(52) U.S. Cl.
CPC .............. *G02C 7/024* (2013.01); *G02C 7/028* (2013.01); *G02C 7/04* (2013.01); *G02C 7/048* (2013.01); *G02C 2202/06* (2013.01)

(58) Field of Classification Search
CPC .......... G02C 7/043; G02C 7/048; G02C 7/04; G02C 7/024; G02C 7/049
USPC ..................................................... 351/159.19
See application file for complete search history.

(56) References Cited

U.S. PATENT DOCUMENTS

| 4,268,133 | A | | 5/1981 | Fischer et al. |
| 4,618,229 | A | * | 10/1986 | Jacobstein ............. G02C 7/043 351/159.41 |
| 4,874,234 | A | | 10/1989 | Wicherle |
| 5,057,578 | A | | 10/1991 | Spinelli |
| 5,100,225 | A | | 3/1992 | Rothe |
| 5,314,960 | A | | 5/1994 | Spinelli et al. |

(Continued)

FOREIGN PATENT DOCUMENTS

| CN | 1432139 A | 7/2003 |
| CN | 1755425 A | 4/2006 |

(Continued)

OTHER PUBLICATIONS

Conway, H., "The Motion of a Contact Lens Over the Eye During Blinking", American Journal of Optometry & Physiological Optics, vol. 59, No. 10, pp. 770-773, (Oct. 1982).

(Continued)

*Primary Examiner* — Jordan Schwartz

(57) ABSTRACT

A method for stabilizing contact lenses includes providing a lens design with a nominal set of stabilization zone parameters, applying a merit function to the lens design based on balancing moments of momentum, and creating a contact lens design with improved stabilization based on the application of the merit functions to the lens design with a nominal set of stabilization zone parameters.

1 Claim, 12 Drawing Sheets

(56) References Cited

U.S. PATENT DOCUMENTS

| | | | |
|---|---|---|---|
| 5,371,147 A | 12/1994 | Spinelli et al. | |
| 5,540,410 A | 7/1996 | Lust et al. | |
| 5,652,638 A | 7/1997 | Roffman et al. | |
| 5,760,870 A | 6/1998 | Payor et al. | |
| 5,805,260 A | 9/1998 | Roffman et al. | |
| 5,912,719 A | 6/1999 | Baude et al. | |
| 6,183,082 B1 | 2/2001 | Clutterbuck | |
| 6,241,355 B1 * | 6/2001 | Barsky | G02C 7/021 351/159.74 |
| 6,305,802 B1 | 10/2001 | Roffman et al. | |
| 6,467,903 B1 | 10/2002 | Back | |
| 6,554,425 B1 | 4/2003 | Roffman et al. | |
| 6,988,800 B2 | 1/2006 | Chou et al. | |
| 7,475,883 B2 | 1/2009 | Christophel et al. | |
| 7,475,983 B2 | 1/2009 | Ye et al. | |
| 7,801,039 B2 | 9/2010 | Monette et al. | |
| 7,862,169 B2 | 1/2011 | Jubin et al. | |
| 8,322,851 B2 | 12/2012 | Gerligand | |
| 8,439,499 B2 | 5/2013 | Gerligand | |
| 8,480,229 B2 | 7/2013 | Gerligand et al. | |
| 9,134,545 B2 * | 9/2015 | Gerligand | G02C 7/028 |
| 2004/0156014 A1 | 8/2004 | Piers | |
| 2005/0041202 A1 | 2/2005 | Jubin et al. | |
| 2005/0237482 A1 | 10/2005 | Jubin et al. | |
| 2006/0055884 A1 | 3/2006 | Molinari et al. | |
| 2007/0091259 A1 | 4/2007 | Svochak | |
| 2008/0055545 A1 | 3/2008 | Clamp | |
| 2008/0079895 A1 | 4/2008 | Jubin et al. | |
| 2009/0225273 A1 | 9/2009 | Clutterbuck et al. | |
| 2011/0149232 A1 | 6/2011 | Gerligand | |
| 2011/0149233 A1 | 6/2011 | Gerligand | |
| 2011/0153287 A1 | 6/2011 | Potze et al. | |

FOREIGN PATENT DOCUMENTS

| | | |
|---|---|---|
| CN | 101517458 A | 8/2009 |
| EP | 0866354 A1 | 9/1998 |
| KR | 1020090076943 | 7/2009 |
| WO | WO0116641 A1 | 3/2001 |
| WO | WO01/75509 A1 | 10/2001 |
| WO | WO0221194 A2 | 3/2002 |
| WO | WO2004/010204 A1 | 1/2004 |
| WO | WO2004/097502 A1 | 11/2004 |
| WO | WO2006009738 A1 | 1/2006 |
| WO | WO2009111545 | 9/2009 |
| WO | WO 2011/084679 A1 | 7/2011 |

OTHER PUBLICATIONS

Grant, R., Mechanics of Toric Soft Lens Stabilization, Journal of the British Contact Lens Associate, Elsevier, NL., vol. 9, No. Supplement 1, Jan. 1, 1986, pp. 44-47 XP007917345.

Jones, M., et al. "Effect of Tear Additives on the Sheer Stress and Normal Stress Acting on the Ocular Surface", *Proceedings 16th Australassian Fluid Mechanics Conference*, Dec. 2-7, 2007. pp. 616-620, Crown Plaza, Gold Coast, Australia.

Knoll, H., et al., "Analysis of Blink-Induced Vertical Motion of Contact Lenses", Jul. 1, 1986, Annual Meeting of the American Academy of Optometry.

International Search Report for corresponding Patent Application No. PCT/US2010/060993, mailed Mar. 31, 2011.

U.S. Appl. No. 12/641,058, filed Dec. 19, 2009, entitled: Contact Lenses with Stabilization Features; Inventors: Pierre Gerligand et al.; Assignee; Johnson & Johnson Vision Care, Inc. Office Actions: Dec. 14, 2010 and May 2, 2011.

U.S. Appl. No. 12/641,089; Entitled: Stabilization of Contact Lenses; Inventors, Edgar Menezes, et al.; Assignee; Johnson & Johnson Vision Care, Inc. Office Actions: Apr. 25, 2011; Oct. 28, 2011 and attachment; Feb. 13, 2012; and Jun. 5, 2012.

U.S. Appl. No. 12/641,116; Entitled: Method for Stabilizing Contact Lenses; Inventors; Pierre Gerligand, et al.; Assignee: Johnson & Johnson Vision Care, Inc. Office Actions: Apr. 22, 2013.

U.S. Appl. No. 12/641,144; Entitled: Stabilized Contact Lenses; Inventor, Pierre Gerligand; Assignee: Johnson & Johns Vision Care, Inc. Office Actions: 11/09/211; Mar. 21, 2012; and Aug. 1, 2012.

U.S. Appl. No. 12/641,166; Entitled Method for Producing Stabilized Contact Lenses: Inventor: Pierre Gerligand; Assignee; Johnson & Johnson Vision Care, Inc. Office Actions: Jan. 29, 2010; May 18, 2011; Aug. 22, 2011 and attachment; Nov. 17, 2011; Apr. 4, 2012; Jun. 14, 2011; and Aug. 7, 3012.

U.S. Appl. No. 12/641,182; Entitled; Contact Lens Eye Model; Inventors: Willem Potze et al.; Assignee: Johnson & Johnson Vision Care, Inc. Office Actions: Nov. 28, 2011; May 1, 2012; and Jul. 20, 2012.

* cited by examiner

METHOD FOR STABILIZING CONTACT LENSES

CROSS-REFERENCE TO RELATED APPLICATION

This application is a divisional of U.S. application Ser. No. 13/910,332 filed Jun. 5, 2013 which is a divisional of U.S. application Ser. No. 12/641,116 filed Dec. 17, 2009, now U.S. Pat. No. 8,480,229.

BACKGROUND OF THE INVENTION

Correction of certain optical defects can be accomplished by imparting non-spherical corrective aspects to one or more surfaces of a contact lens such as cylindrical, bifocal, or multifocal characteristics. These lenses must generally be maintained at a specific orientation while on the eye to be effective. Maintenance of the on-eye orientation of a lens typically is accomplished by altering the mechanical characteristics of the lens. Prism stabilization including decentering of the lens' front surface relative to the back surface, thickening of the inferior lens periphery, forming depressions or elevations on the lens' surface, and truncating the lens edge are examples of stabilization approaches. Additionally, dynamic stabilization has been used in which the lens is stabilized by the use of thin zones, or areas in which the thickness of the lens' periphery is reduced. Typically, the thin zones are located at two regions that are symmetric about either the vertical or horizontal axis of the lens from the vantage point of its on-eye placement.

Evaluating lens design involves making judgments concerning the performance of the lens on-eye and then optimizing the design if necessary and possible. This process is typically done by clinically evaluating the test design in patients. However, this process is time consuming and expensive because it requires a significant number of patients to be tested since patient to patient variability must be accounted for.

There is a continuing need for improving the stabilization of certain contact lenses.

SUMMARY OF THE INVENTION

The invention is a contact lens designed with improved stabilization relative to a nominal stabilized design.

In another aspect of the invention, a method for stabilizing contact lenses incorporates a lens design with a nominal set of stabilization zone parameters, evaluating the on-eye performance of the lens design, calculating a merit function based on this performance, and optimizing the stabilization zone parameters by applying the merit function. This process may be performed iteratively via a virtual model (e.g., software based) that simulates the effects of eye mechanics such as blinking and adjusts the stabilization scheme accordingly.

In yet another aspect of the invention, contact lenses are stabilized according to a scheme in which the moment of momentum of torques acting on the lens on-eye are balanced.

In yet another aspect of the invention, contact lenses are stabilized by the formation of one or more zones having a different thickness than the remainder of the lens and in which these zones are located on the lenses such that the moment of momentum of torques acting on the lens when the lens is on-eye will be balanced.

In yet another aspect of the invention a contact lens has a stabilization zone with the bulk of its length lying beneath the horizontal axis of the lens.

In yet another aspect of the invention a contact lens has a stabilization zone having a differing rate of change of slope (from its peak) in one direction relative to the other.

In yet another aspect of the invention a contact lens has a different in height profile above the horizontal axis than it does below the horizontal axis.

DETAILED DESCRIPTION

Figure 1:
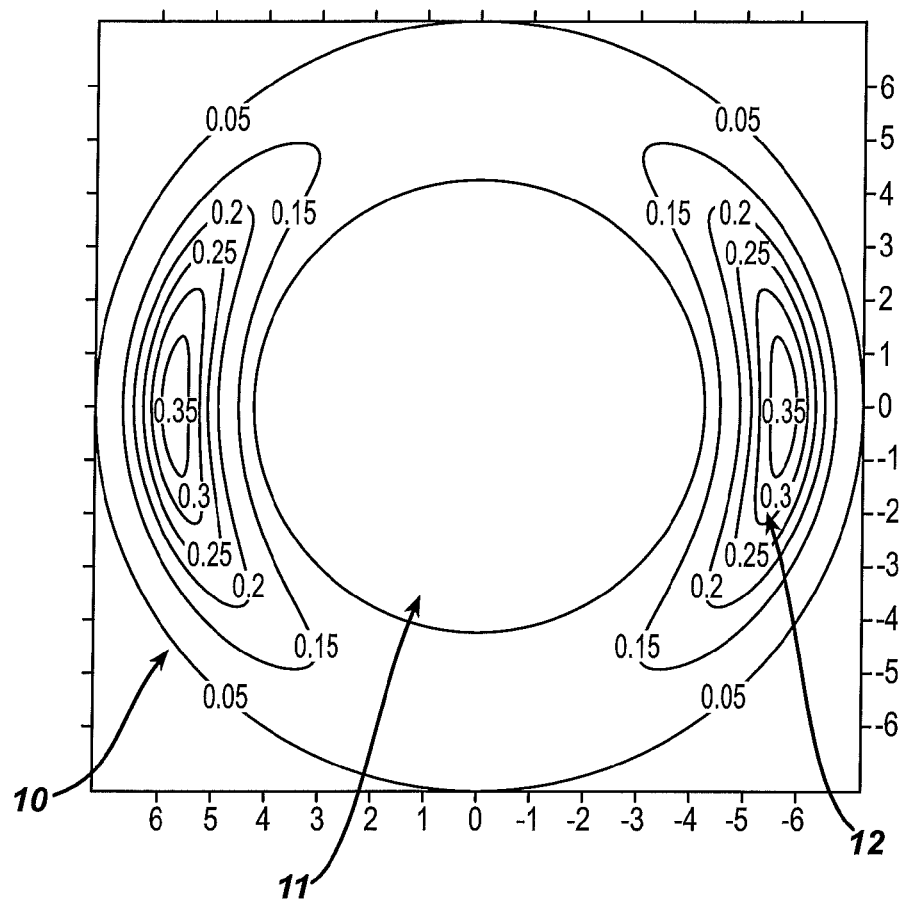
FIG. 1 is a front or object view of a stabilized contact lens.

Contact lenses of this invention have designs that optimize stabilization based on balancing various forces that act on the lenses. This involves the application of a design process that balances torques operating on the eye, components of the eye, and ultimately the stabilized lens that is placed on the eye. Preferably, improved stabilization is attained by starting the improvement process with a nominal design that includes stabilization elements. For example, a lens design that has two stabilization zones that are symmetric about both the horizontal and vertical axes running through the center is a convenient reference from which to optimize stabilization of the lens according the inventive methods. By "stabilization zone" is meant an area of the peripheral zone of the lens which has thickness values larger than the average thickness of the remaining areas of the peripheral zone. By "peripheral zone" is meant the area of the lens surface circumferentially surrounding the optic zone of the lens, and extending up to but not including the edge of the lens. Another stabilization design that is a useful starting point is described in US Patent Publication 20050237482 which is incorporated herein by reference but any stabilization design can be used as the nominal design that is then optimized according to this invention. The stabilization design improvement process can also incorporate testing the improvement with the eye model described below, evaluating the results of the testing, and continuing iteratively with the improvement process until a desirable level of stabilization is achieved. FIG. 1 depicts the front, or object side, surface of a stabilized lens. Lens 10 has an optical zone 11. The lens' periphery surrounds optic zone 11. Two thick regions 12 are located in the periphery and are stabilization zones.

The model that is preferably used in the process to produce the new designs incorporates various factors and assumptions that simulate the mechanical operation and their effects on lens stability. Preferably, this model is reduced to software using standard programming and coding techniques according to well-known programming techniques. In broad overview, the model is used in the process for designing stabilized lenses by simulating the application of the forces described below in a prescribed number of blinks of the eye. The degree to which the lens rotates and decenters is determined accordingly. The design is then altered in a way that is directed to bringing rotation and/or centration to more desirable levels. It is then subjected to the model again to determine translation upon blinking after the pre-determined number of blinks. The alteration of the design is accomplished by the application of merit functions described in more detail below.

The model assumes that the eye preferably consists of at least two spherical surface parts representing the cornea and the sclera and that the origin of the x-y-z coordinate axes is in the center of the sphere representing the cornea. More complex surfaces such as aspheric surfaces may also be used. The base shape of the lens consists of spherical surface parts but the base curve radius of the lens is allowed to change from the center of the lens towards the edge. More than one base curve may be used to describe the back surface. It is assumed that a lens positioned on the eye assumes the same shape as that of the eye. The thickness distribution of the lens need not necessarily be rotationally symmetric and indeed is not symmetric according to some preferred embodiments of the inventive lenses. Thick zones at the edge of the lens may be used to control the position and orientation behavior of the lens. A uniform thin film of liquid (tear film) exists between the lens and the eye, with a typical thickness of 5 μm. This tear film is referred to as the post-lens tear film. At the lens edge the thickness of the liquid film between the lens and eye is much smaller and is referred to as the mucin tear film. A uniform thin film of liquid (also, tear film) with a typical thickness of 5.0 μm exists between the lens and the lower and upper eyelids and these are referred to as the pre-lens tear films. The boundaries of both the lower and the upper eyelids lie in planes having unit normal vectors in the x-y plane. Hence, the projections of these boundaries on the plane perpendicular to the z-axis are straight lines. This assumption is also made during the motion of the eyelids. The upper eyelid exerts a uniform pressure on the contact lens. This uniform pressure is exerted on the whole area of the contact lens covered by the upper eyelid or on a part of this area near the boundary of the upper eyelid with uniform width (measured in the direction perpendicular to the plane through the curve describing the edge of the eyelid). The lower eyelid exerts a uniform pressure on the contact lens. This pressure is exerted on the whole area of the contact lens covered by the lower eyelid. The pressure exerted by the eyelids on the contact lens contributes to the torque acting at the lens through a non-uniform thickness distribution (thick zone) of the contact lens, especially near the edge. The effect of this pressure on the torques acting at the contact lens is referred to as the melon seed effect. Viscous friction exists in the post-lens tear film if the lens moves with respect to the eye. Viscous friction also exists in the mucin tear film between lens edge and the eye if the lens moves with respect to the eye. Additionally, viscous friction exists in the pre-lens tear film if the lens moves and/or the eyelids move. Strains and stresses in the lens occur due to the deformation of the lens. These strains and stresses result in an elastic energy content of the lens. As the lens moves with respect to the eye and the deformation of the lens changes, the elastic energy content changes. The lens tends toward a position at which the elastic energy content is minimal.

Figure 2A:
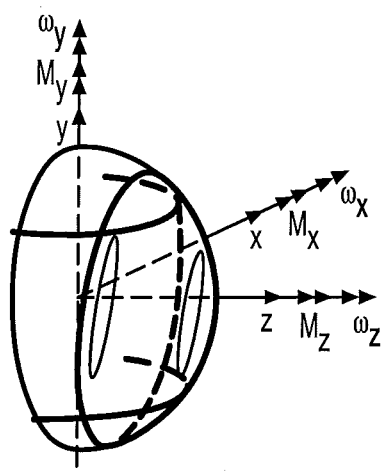
FIGS. 2A-2C are schematic representations of an eye with an inserted lens; it identifies the axis of rotation and various torques acting at the lens.
Figure 2B:
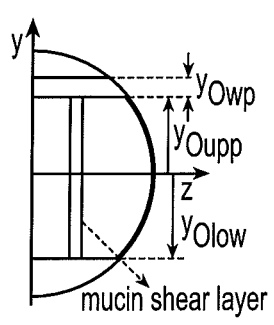
Figure 2C:
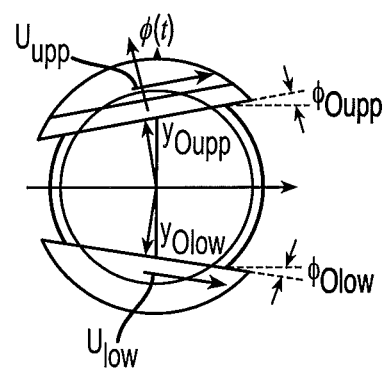

The parameters describing the geometry of the eye (cornea and sclera), base shape of the lens and the motion of the eyelids are shown in FIGS. 2A-2C. The motion of the lens follows from the balance of moment of momentum acting at the lens. Inertial effects are neglected. Then the sum of all moments acting at the lens is zero. Hence, $$\vec{O} = \vec{M}_{l,cor} + \vec{M}_{l,muc} + \vec{M}_{l,low} + \vec{M}_{l,upp} + \vec{M}_{l,Ulow} + \vec{M}_{l,Uupp} + \vec{M}_{l,Vupp} + \vec{M}_{ms,low} + \vec{M}_{ms,upp} + M_{elast} + \vec{M}_{grav}$$

The first 4 moments are resisting torques and are linearly dependent on the lens motion. The remaining torques are driving torques. This balance of moment of momentum results in a non-linear first order differential equation for the position β of the lens $$A(\vec{\beta}, t) \frac{d\vec{\beta}}{dt} = \vec{M}_{total}^{driving}(\vec{\beta}, t).$$

This equation is solved with a fourth order Runge-Kutta integration scheme. The positions of points on the contact lens follow from a rotation around the rotation vector β(t). The rotation matrix R(t) transforming the old position of points to the current position follows from Rodrigues's formula $$\vec{x}_{new} = \vec{x}_{old} + \sin \beta (\vec{n} \times \vec{x}_{old}) + (1 - \cos \beta)(\vec{n} \times (\vec{n} \times \vec{x}_{old}))$$
$$\vec{x}_{new} = R(t) \vec{x}_{old}$$

where $\vec{n} = \frac{\vec{\beta}}{|\vec{\beta}|}$ and $\beta = |\vec{\beta}|$.

In the numerical integration method a time-discretization is used. Then the motion of the lens can be seen as a number of subsequent rotations, hence at the next time step $t_{n+1}$ the rotation matrix is $$R_{n+1} = R_{\Delta t} R_n$$

where $R_{\Delta t}$ is the rotation during the time step Δt.

The rotation matrix is decomposed into a rotation $R_\alpha$ and a decentration $R_\theta$ of the lens $$R(t) = R_\theta(t) R_\alpha(t)$$

The rotation of the lens is a rotation around the centerline of the lens. The decentration is a rotation around a line in the (x, y) plane. Hence, the position of the lens is seen as a rotation $\vec{\alpha}$ of the lens around its centerline followed by a decentration $\vec{\theta}$.

In a preferred method of the invention, merit functions (MFs) based on these relationships are fashioned to adjust and thereby improve stabilization schemes of nominal designs. These merit functions are defined based on lens on-eye performance requirements. In a preferred embodiment the merit functions are defined but not limited to: a) lens rotation and centration performance (Equation 1), b) lens stability around a resting position (Equation 2), or c) Lens rotation and centration performance and stability around resting position (Equation 3).

$$MF_1 = \sqrt{W_R\left(\frac{Rot}{R_{REF}}\right)^2 + W_C\left(\frac{Cent}{C_{REF}}\right)^2}$$ (Equation 1)

By lens rotation is meant the angular movement of the lens around its z-axis occurring during and in between blinks. Rotation may be clockwise or counter clockwise depending on the initial position of the lens on the eye or the lens behavior when modeled on the eye.

By lens centration is meant the distance between the lens geometric center and the corneal apex. Centration is recorded in an x-y coordinate system in the plane of the corneal apex.

By lens stability is meant the amount of maximum lens movement in the horizontal direction (x axis) and the vertical direction (y axis) and amount of lens rotation during the blink period. Lens stability is preferably recorded with no lens misorientation and decentration after the lens reaches its final position.

Using Equation 1 as exemplary of the purpose and application of the merit function, Rot and Cent respectively describes lens performance in rotation and centration of the lens design to be optimized. $R_{REF}$ and $C_{REF}$ are variables describing the lens performance in rotation and centration of the initial lens design. $W_R$ and $W_C$ are two weighting factors allowing the adjustment of the contribution of one factor relative to the other and can take values between 0 and 1. When applied, as exemplified below, these functions are best solved numerically. The weighting factors are applied so that components of interest are given appropriate consideration. They may be equal or one component may be of more interest than another. Thus, for example, if one is more concerned with optimizing rotation than centration they would select a $W_R$ that is greater than $W_C$. A stabilized design is improved when its merit function is decreased relative to the design that preceded it under this construct. Further, it is optimized when the merit function is minimized in such a case. Of course, one lens design may be preferable to another for reasons other than stabilization so an improved stabilization may still be undertaken according to the invention without necessarily optimizing the stabilization aspect of the design.

$$MF_2 = \sqrt{W_X\left(\frac{X_{Range}}{X_{REF}}\right)^2 + W_Y\left(\frac{Y_{Range}}{Y_{REF}}\right)^2 + W_\theta\left(\frac{\theta_{Range}}{\theta_{REF}}\right)^2}$$ (Equation 2)

In Equation 2, $X_{Range}$, $Y_{Range}$ and $\theta_{Range}$ describe lens performance in stability in horizontal direction, vertical direction and rotation of the lens design to be optimized, $X_{REF}$, $Y_{REF}$ and $\theta_{REF}$ the lens performance in stability in horizontal direction, vertical direction and rotation of the initial lens design, and $W_X$, $W_Y$ and $W_\theta$ the weighting factors allowing the adjustment of the contribution of the factors relative to each others.

$$MF_3 = \sqrt{W_R\left(\frac{Rot}{R_{REF}}\right)^2 + W_C\left(\frac{Cent}{C_{REF}}\right)^2 + W_S\left(\frac{Stab}{S_{REF}}\right)^2}$$ (Equation 3)

In Equation 3 Rot, Cent and Stab describe lens performance in rotation, centration and stability of the lens design to be optimized, $R_{REF}$, $C_{REF}$ and $S_{REF}$ the lens performance in rotation, centration and stability of the initial lens design, and $R_{REF}$, $C_{REF}$ and $S_{REF}$ the weighting factors allowing the adjustment of the contribution of the factors relative to each others.

In another embodiment merit functions include wearing comfort and can also include stabilization zone volume, stabilization zone surface area, soft contact lens wearer awareness to stabilization zone or any other relevant criteria.

In further preferred embodiments the merit functions are defined from the following parameters in the same fashion as those set forth above:
  Rotation performance:
    Surface area below the rotation curve response
    Time to reach resting position in rotation within +/−5.0 degrees
    Initial rotation speed
  Centration performance:
    Surface area below the centration curve response
    Time to reach resting position in centration
    First time to reach the final resting position
    Centration speed
  Stability performance:
    Magnitude of movement in horizontal direction
    Magnitude of movement in vertical direction
    Magnitude of rotation
    Duration of horizontal movement
    Duration of vertical movement
    Duration of rotation.
  Wearing comfort:
    Volume of material in excess for building stabilization zone
    Surface area covered by stabilization zone
    Lens wearer awareness to stabilization zone There is no limitation in the type of stabilization that can be produced by the method. Stabilization zones can be of the following type:
  Symmetrical with respect to X and Y axis
  Symmetrical with respect to X or Y-axis
  Asymmetric with respect to both X and Y axis
  Constant radial distance
  Variable radial distance Various stabilization zone parameters may be evaluated during the optimization, including without limitation the following: zone length, peak thickness location, ramp angles on either side of the peak, circumferential tilt of the zone, and zone width. The optimization parameters can also include lens diameter, base curve, thickness, optic zone diameter, peripheral zone width, material properties, other parameters describing lens features.

In a preferred embodiment of the invention, two types of improvement approaches are disclosed. In the first, a full optimization is conducted in which the model of on-eye behavior with a given iteration of the stabilization adjustment induced by the MF requires several blink cycles until the lens reaches its resting position. In another embodiment, the design is improved during a predetermined number of blink cycles. Three blink cycles are generally the least that will be effective in providing meaningful stabilization improvements. In either case, the process is conducted iteratively with the application of the MF to a nominal design. In the case in which three blink cycles are used, an initial blink orients the lens at an angle α from the horizontal, intermediate blink where the lens is oriented at an angle β from the horizontal, and final blink where the lens is positioned at the resting location. In the most preferred embodiment the angle α is set to 45 degrees and the angle β is set to 22 degrees (but both angles are not limited to these values). In another embodiment the optimization process is a combination of both approaches where a reduced number of blink cycles is preliminary used to reach an intermediate solution then several blink cycles are used to validate that the optimization has been conducted to an acceptable degree.

Figure 3:
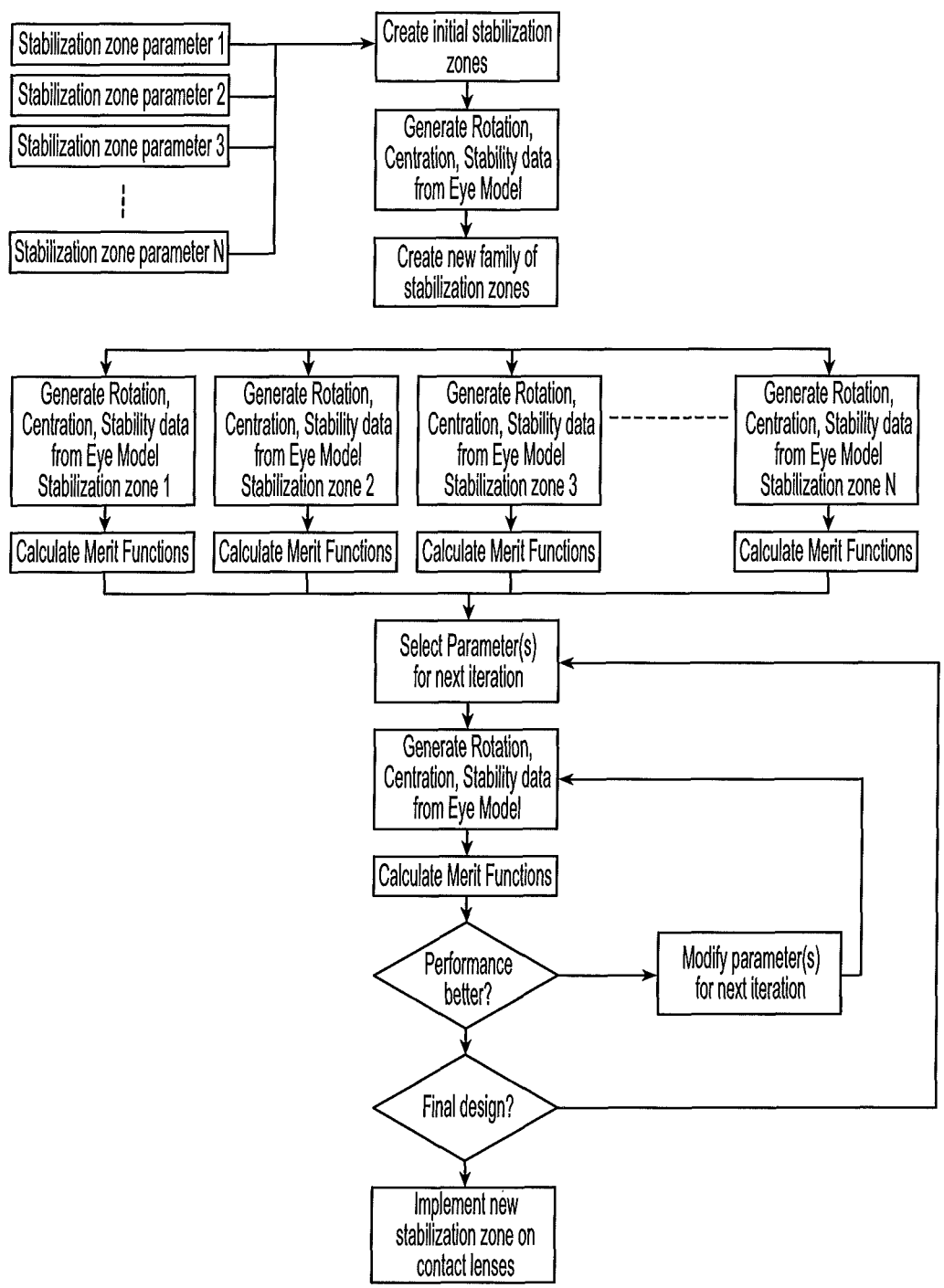
FIG. 3 is a flowchart showing a stabilization optimization process according to the invention.

FIG. 3 shows a flow chart of this improvement process. The initial stabilization zones design can be either a pre-existing design or a new design. Stabilization zone parameters from these designs are determined. These parameters are obtained from calculating the design performance when the parameters are modified around their initial values. Parameters that give the most variations in the lens performance are preferably selected for the optimization process. In step 1, stabilization zone parameters are selected for consideration. These can include, for example, magnitude of the stabilization zone ($Z_0$), peak location along 0-180 deg. meridians ($r_0$), peak location angularly around the 0-180 deg. meridian ($\theta_0$), slope above and below the peak location, the angular length of the stabilization zone ($\sigma_\theta$), stabilization zones rotated around the peak location, and width of the stabilization zone ($\sigma_R$) among many others.

TABLE 1

| | Weight | | | | |
|---|---|---|---|---|---|
| | $W_R$ | $W_C$ | $W_X$ | $W_Y$ | $W_\theta$ |
| Example 1 | 1.00 | 1.00 | 0.50 | 0.50 | 1.70 |
| Example 2 | 1.00 | 1.00 | 0.50 | 0.50 | 1.70 |
| Example 3 | 1.00 | 1.00 | 0.50 | 0.50 | 1.70 |
| Example 4 | 1.00 | 1.00 | 0.50 | 0.50 | 1.70 |

| | Performance indicator | | | | |
|---|---|---|---|---|---|
| | $R_{REF}$ | $C_{REF}$ | $X_{range}$ | $Y_{range}$ | $\theta_{range}$ |
| Example 1 | 505.110 | 1.100 | 1.03 | 2.65 | 1.88 |
| Example 2 | 218.91 | 0.416 | 1.02 | 2.67 | 0.52 |
| Example 3 | 277.22 | 0.356 | 1.03 | 2.68 | 0.67 |
| Example 4 | 349.32 | 0.780 | 1.02 | 2.67 | 0.55 |

| | Merit functions | | % Improvement | |
|---|---|---|---|---|
| | Equ. (1) | Equ. (2) | Equ. (1) | Equ. (2) |
| Example 1 | 1.414 | 1.643 | N/A | N/A |
| Example 2 | 0.575 | 1.062 | 59.32 | 35.35 |
| Example 3 | 0.637 | 1.106 | 54.96 | 32.68 |
| Example 4 | 0.990 | 1.070 | 29.97 | 34.88 |

Performance indicators obtained from designs of examples 1, 2, 3, and 4 applied to the merit functions defined by equations (1) and (2).

In step 2, the lens is defined mathematically in terms of the stabilization zones parameters to arrive at an initial or nominal design. There is no limitation in the type of mathematic function describing the stabilization zones. Stabilization zones can also be described using computer generated software such as CAD applications. The mathematically described design (with defined parameters) is entered into the eye model in Step 3 and rotation, centration, and stability data is generated as shown in Table 1). This data can then be used to modify one or more of the stabilization parameters in optional step 4.

The stabilization zones are modified either by reshaping, scaling, rotating, shifting, or using any other techniques to modify the current design. In steps 5a-5d the modified stabilization parameters are again run through the eye model to generate rotation, centration, and stability data for each of now modified designs. In each case of corresponding steps 6a-6d merit functions are created and applied to each new design to generate new rotation, centration, and stability data in steps 7 and 8 as the lens is maneuvered (preferably through rotation). Again, in each iteration merit functions are calculated in step 9 and checked to see if they are decreasing in step 10. A decrease is an improvement over the previous iteration. If the merit function did not decrease then a stabilization parameter can then be modified again in optional step 11 and the resulting modified lens design is then put back into the selection and data generation steps 7 and 8. If the merit function did decrease it shows an improvement in stabilization and the lens design is determined to be the final design (step 12) or other zones are again improved in optional step 13.

The invention may find its greatest utility in toric and multifocal lenses. Additionally, the designs may be useful in lenses customized to a specific individual's corneal topography, lenses incorporating high order wave-front aberration correction, or both. Preferably, the invention is used to stabilize toric lenses or toric multifocal lenses as, for example, disclosed in U.S. Pat. Nos. 5,652,638, 5,805,260 and 6,183,082 which are incorporated herein by reference in their entireties.

As yet another alternative, the lenses of the invention may incorporate correction for higher order ocular aberrations, corneal topographic data, or both. Examples of such lenses are found in U.S. Pat. Nos. 6,305,802 and 6,554,425 incorporated herein by reference in their entireties.

The lenses of the invention may be made from any suitable lens forming materials for manufacturing ophthalmic lenses including, without limitation, spectacle, contact, and intraocular lenses. Illustrative materials for formation of soft contact lenses include, without limitation silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, such as etafilcon A.

Curing of the lens material may be carried out by any convenient method. For example, the material may be deposited within a mold and cured by thermal, irradiation, chemical, electromagnetic radiation curing and the like and combinations thereof. Preferably, for contact lens embodiments, molding is carried out using ultraviolet light or using the full spectrum of visible light. More specifically, the precise conditions suitable for curing the lens material will depend on the material selected and the lens to be formed. Suitable processes are disclosed in U.S. Pat. No. 5,540,410 incorporated herein in its entirety by reference.

The contact lenses of the invention may be produced by any convenient method. One such method uses an OPTOFORM™ lathe with a VARIFORM™ attachment to produce mold inserts. The mold inserts in turn are used to form molds. Subsequently, a suitable liquid resin is placed between the molds followed by compression and curing of the resin to form the lenses of the invention. One ordinarily skilled in the art will recognize that any number of known methods may be used to produce the lenses of the invention.

The invention will now be further described with respect to the following non-limiting examples.

EXAMPLE 1

Figure 4A:
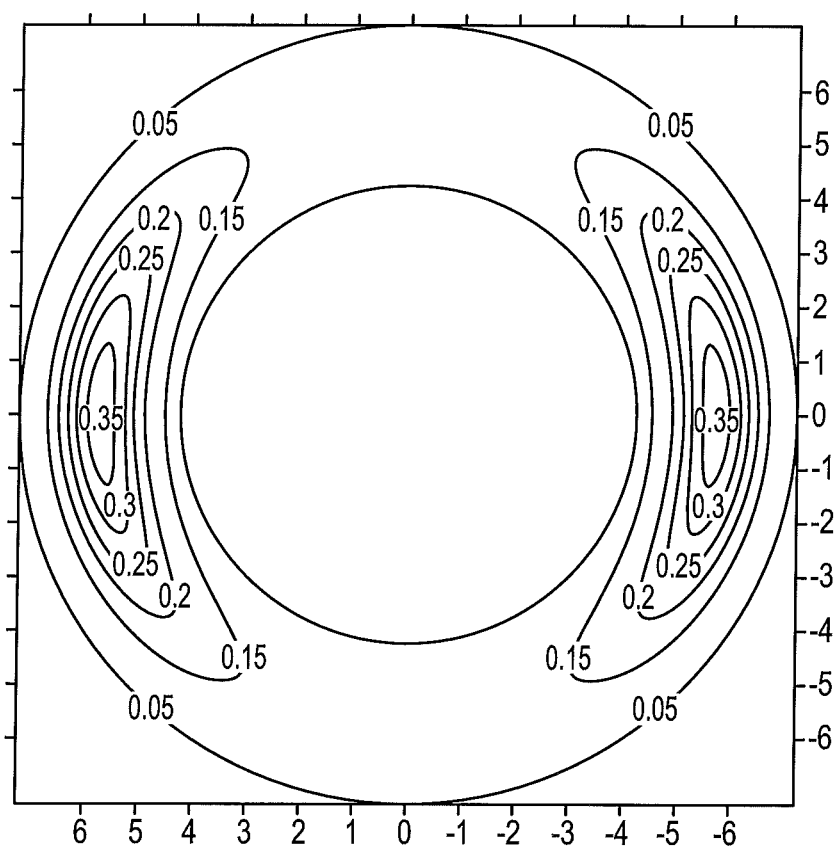
FIGS. 4A-4C illustrates a front view of a stabilized lens with stabilization zones corresponding to example 1 along with corresponding circumferential and radial thicknesses.
Figure 4B:
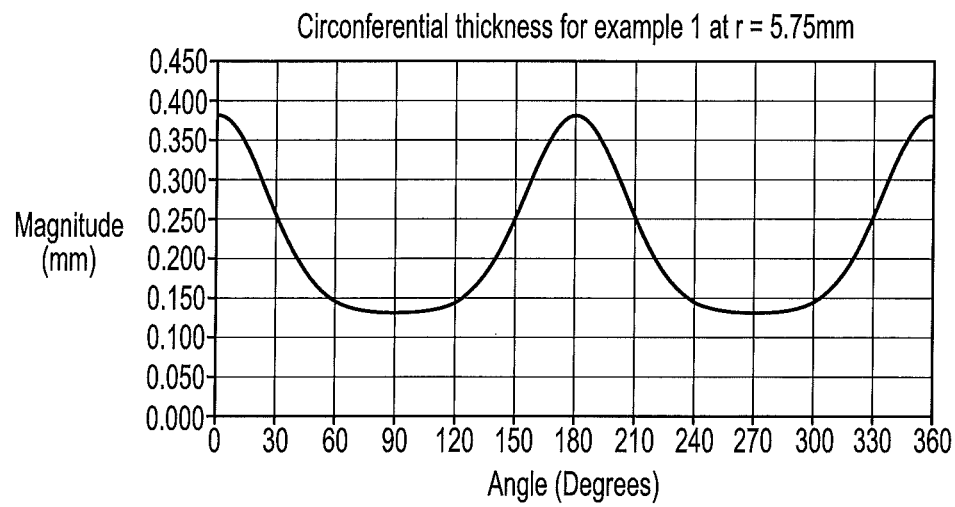
Figure 4C:
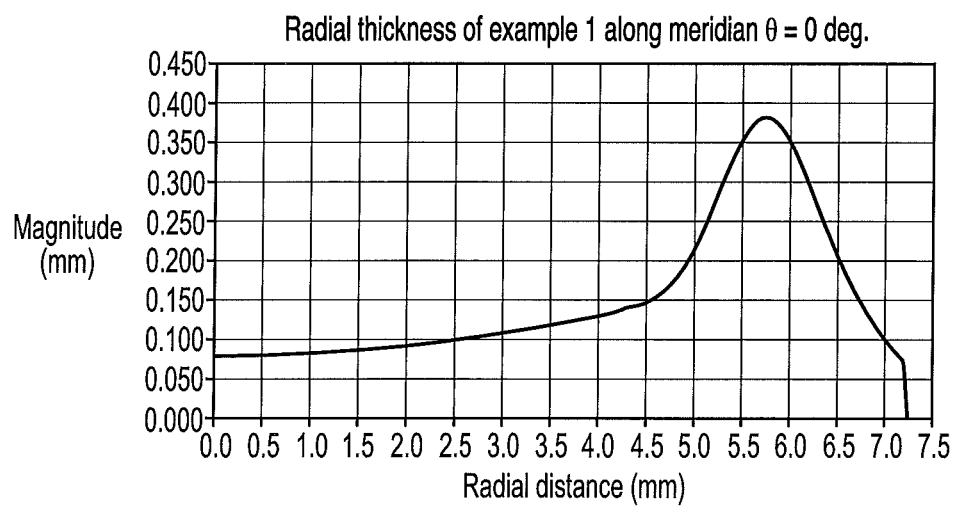

A contact lens having a known design for correcting the vision of astigmatic patients is shown in FIG. 4A along with corresponding circumferential and radial thicknesses as shown in FIGS. 4B and 4C respectively. It was designed using conventional lens design software with the following input design parameters:

Sphere power: −3.00D
Cylinder Power: −0.75D
Cylinder Axis: 180 deg
Lens diameter: 14.50 mm
Front optical zone diameter of 8.50 mm
Back optical zone diameter of 11.35 mm
Lens base curve: 8.50 mm
Center Thickness: 0.08 mm
Eye model parameters used are listed in Table 2A and 2B.

The stabilization zone is an extra thick zone added to the thickness profile of that lens. The initial stabilization zone is constructed using a combination of normalized Gauss functions describing the radial and angular changes in thickness. The mathematical expression describing the Sag of the stabilization zone in polar coordinates is:

$$Z(R, \theta) = Z_0 \cdot \mathrm{Exp}\left(-0.5 \cdot \left(\frac{r - r_0}{\sigma_R}\right)^2\right) \cdot \mathrm{Exp}\left(-0.5 \cdot \left(\frac{\theta - \theta_0}{\sigma_\theta}\right)^2\right)$$

Where $Z_0$ is the maximum magnitude of the stabilization zone, $r_0$ and $\theta_0$ the radial and angular location of the peak, and $\sigma_R$ and $\sigma_\theta$ are parameters controlling the profile of the thickness change in the radial and angular directions.

The change in slope along the radial and angular direction is obtained using log-normal Gauss distributions. The equation becomes:

$$Z(R, \theta) = Z_0 \cdot \mathrm{Exp}\left(-0.5 \cdot \left(\frac{\mathrm{Log}(r) - r_0}{\sigma_R}\right)^2\right) \cdot \mathrm{Exp}\left(-0.5 \cdot \left(\frac{\mathrm{Log}(\theta) - \theta_0}{\sigma_\theta}\right)^2\right)$$

The design parameters controlling the stabilization zones are:
Change in magnitude of the stabilization zone ($Z_0$).
Peak location changes along 0-180 deg. meridians ($r_0$).
Peak location changes angularly around the 0-180 deg. meridian ($\theta_0$).
Slope changes above and below the peak location.
Change of the angular length of the stabilization zone ($\sigma_\theta$).
Stabilization zones rotated around the peak location.
Change in width of the stabilization zone ($\sigma_R$) along the 0-180 deg. meridian.

The values from which the initial stabilization zone were built were:
$Z_0$=0.25 mm
$r_0$=5.75 mm
$\sigma_R$=0.50 mm
$\theta_0$=180 degrees and 0 degrees for left and right stabilization zones, respectively
$\sigma_\theta$=25.0 degrees The stabilization zone was then added to the original lens thickness profile. The final maximum lens thickness was 0.38 mm. A graphic illustration of the profile is shown in FIGS. 4B and 4C. Stabilization zones are symmetric about both horizontal and vertical axes with slopes that uniformly descend from peak height

TABLE 2A

Initial parameters provided to the eye model.

| | | | |
|---|---|---|---|
| Tear film | Aqueous layer viscosity | 8.30E−04 | [Pa · s] |
| | Mucin layer viscosity | 1.50E−03 | [Pa · s] |
| | Mucin layer thickness | 3.50E−07 | [m] |
| | Pre-lens tear film thickness | 5.00E−06 | [m] |
| | Post-lens tear film thickness | 5.00E−06 | [m] |
| Eye geometry | Cornea Radius | 7.95E−03 | [m] |
| | Sclera Radius | 1.15E−02 | [m] |
| | Visible Cornea Radius | 5.82E−03 | [m] |
| | File (eye geometry) | | [mm] |
| Lens properties | Lens base curve radii | 8.50E−03 | [m] |
| | Lens transition radii | 5.50E−03 | [m] |
| | File (lens back geometry) | | [mm] |
| | Contact angle edge | −5.00 | [degree] |
| | Contact area lens edge | 2.40E−05 | [m2] |
| | Density of lens material | 1000 | [Kg/m3] |
| | Young's modulus | 280000 | [N/m2] |
| | Poisson's ratio | 0.48 | [—] |
| | File (lens normal thickness profile) | | [mm] |
| Eyelid geometry and blink properties | Lower eyelid lateral displacement | 4.00E−03 | [m] |
| | Upper eyelid lateral displacement | 3.50E−03 | [m] |
| | Time to complete downward motion upper eyelid | 0.082 | [s] |
| | Time to complete blink | 0.258 | [s] |
| | Time between two blinks | 3 | [s] |
| | Eyelid pressure | 200 | [N/m2] |
| | Lower eyelid position at start of blink | 6.35E−03 | [m] |
| | Upper eyelid position at start of blink | 4.70E−03 | [m] |
| | Width pressure band at upper eyelid edge | 5.00E−04 | [m] |
| | Angle upper eyelid at start of blink | −4.47 | [degree] |
| | Angle lower eyelid at start of blink | −2.07 | [degree] |
| | Eye velocity | 2 | — |
| Gaze direction | Eye gaze (choice in predefined transient gaze direction) | 0 | — |
| | Amplitude gaze | 20 | [degree] |
| | Frequency gaze | 2.78 | [Hz] |
| Initial position | Initial rotation angle lens | 0.00 | [degree] |
| | Initial decentration in X-direction | 0.00 | [m] |
| | Initial decentration in Y-direction | 0.00 | [m] |
| Gravity | Gravity | 9.80 | [m/s2] |
| Simulation parameters | Number of cycles that has to be simulated | 5 | — |
| | Number of time steps in [0, Tdownblink] (If <0 then specified time step is used) | −400 | — |
| | Specified time step | 0.005 | [second] |
| | Lens discretization in radial direction | 20 | — |
| | Lens discretization in circumferential direction | 90 | — |

TABLE 2B

Initial parameters provided to the eye model.

| | |
|---|---|
| Eye velocity | |
| 1 | Velocity eyelid constant |
| 2 | Velocity eyelid matching human eye velocity |
| Eye gaze (choicein predefined transient gaze direction) | |
| 0 | No change in gaze direction |
| 1 | Horizontal motion |
| 2 | Vertical motion |
| 3 | Circular motion (counter clockwise) |
| 4 | Circular motion (clockwise) |
| 5 | Constant gaze in horizontal direction |
| 6 | Constant gaze in vertical direction |

The contact lens rotation and centration characteristics were determined using the eye model described above with initial parameters provided in Table 2. Rotation of the lens steadily decreased from about 45 deg to less than 10 degrees as the number of blinks modeled went from 0 to 20. Over the course of blinks 1-20, centration remained relatively steady from about 0.06 mm to just over 0.08 mm. The resulting value of the merit function defined by equation 1 applied on the prior art lens was 1.414 with $W_R=W_C=1.0$. This example shows the rotation, centration and stability achieved by the lens of these parameters where maintenance of the on-eye orientation is achieved using depressions or elevations on the periphery of the front surface.

EXAMPLE 2

A new stabilization zone was designed using the eye model and optimization method described above and the initial design described in Example. The merit function was defined using
  Surface area below the response in rotation.
  Surface area below the response in centration.
  Identical weight for rotation and centration, $W_R=W_C=1.0$.
  The values from which the initial stabilization zone were built were:
  $Z_0=0.25$ mm
  $r_0=5.75$ mm
  $\sigma_R=0.50$ mm
  $\theta_0=180$ degrees and 0 degrees for left and right stabilization zones, respectively
  $\sigma_\theta=25.0$ degrees
The stabilization zone was then added to the original lens thickness profile.

The stabilization zone was rotated around the peak location until the lens performance characteristics represented a significant improvement over the initial design. The rotation was obtained by applying a coordinate transformation (rotation around the peak location) on the original stabilization zone coordinates:

$$(x, y) = \begin{bmatrix} \cos(\alpha) & \sin(\alpha) \\ \sin(\alpha) & \cos(\alpha) \end{bmatrix} (x_0, y_0)$$

Where $(x_0, y_0)$ were the original coordinates and $(x, y)$ were the new coordinates, and $\alpha$ the angle of rotation.

Figure 5A:
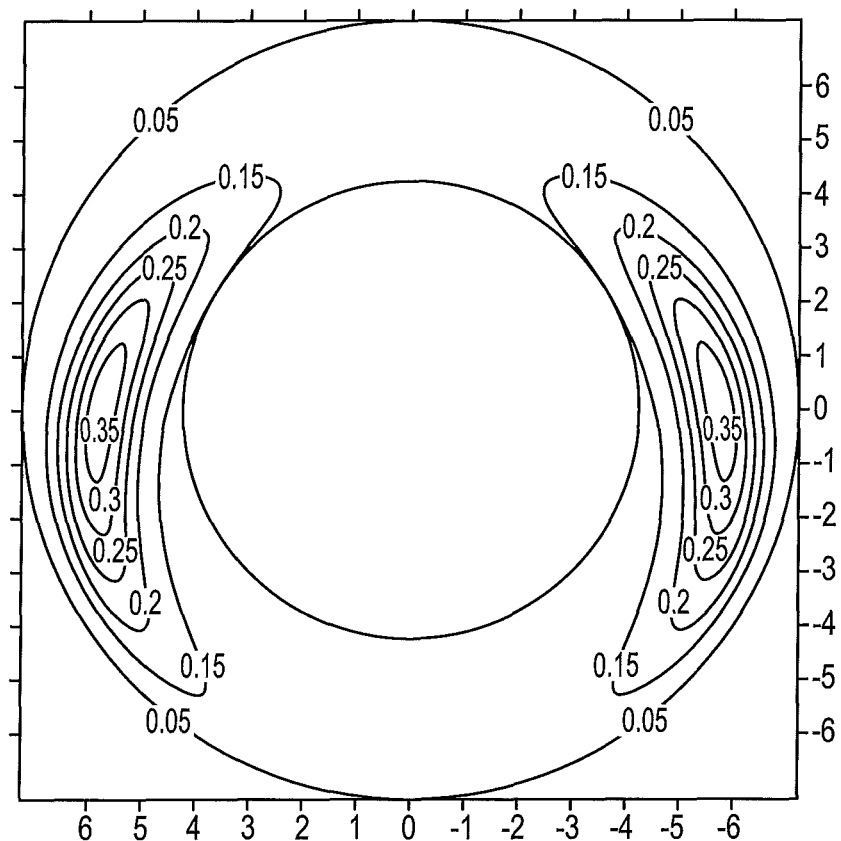
FIGS. 5A-5C illustrate a front view of a stabilized lens with stabilization zones corresponding to example 2 along with corresponding circumferential and radial thicknesses.
Figure 5B:
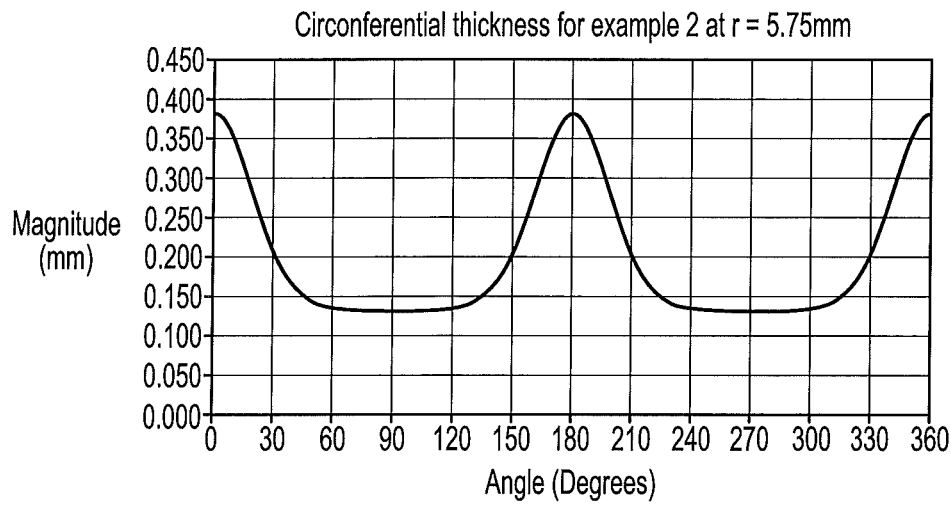
Figure 5C:
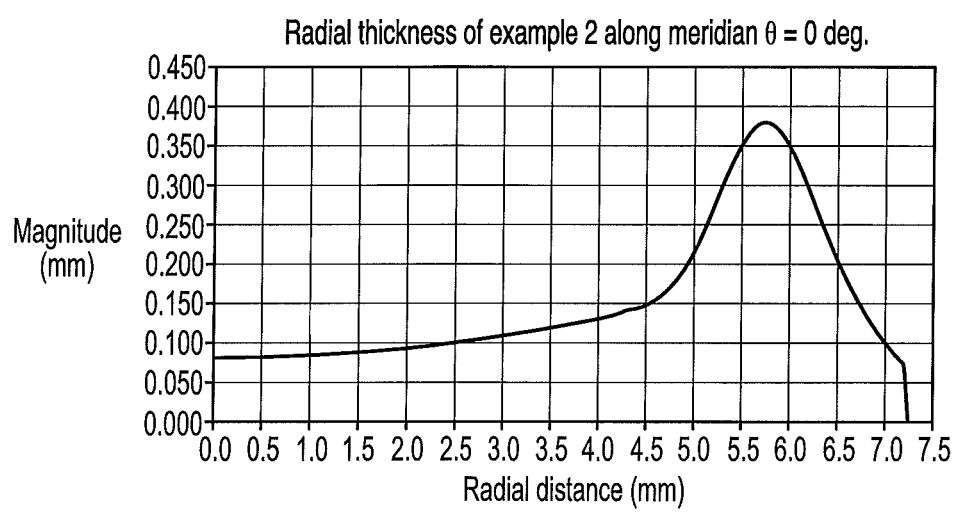

An improved stabilization design was obtained in which the final orientation of the stabilization zone was 10.0 degrees off from the vertical with the upper portion of the stabilization oriented toward the center of the lens as shown in FIG. 5A along with corresponding circumferential and radial thicknesses as shown in FIGS. 5B and 5C respectively. Additionally, stabilization zones are not symmetric about the horizontal axis. In this case, the bulk of the long dimension of each zone lies above the horizontal axis. The final value of the merit function was 0.58. Improvement on the merit function was of the order of 59%. Rotation declined sharply relative to the initial stabilization design. Beginning at blink 4 less than 30 degrees rotation were seen with no rotation from blink 12 onward compared to about 40-25 degrees of rotation seen in the initial design over the same range of blinks. Centration remained steady with less than 0.04 mm on blink 1 and less than 0.03 thereafter in the improved design relative to 0.06 to greater than 0.08 for the initial design over the same number of blink cycles. This example shows improved rotation, centration and stability as compared with the lens of Example 1.

EXAMPLE 3

A new stabilization zone was designed using the eye model and optimization method described above and the initial design described in Example 1. The merit function was defined using
  Surface area below the response in rotation.
  Surface area below the response in centration.
  Identical weight for rotation and centration, $W_R=W_C=1.0$.
  The values from which the initial stabilization zone were built were:
  $Z_0=0.25$ mm
  $r_0=5.75$ mm
  $\sigma_R=0.50$ mm
  $\theta_0=180$ degrees and 0 degrees for left and right stabilization zones, respectively
  $\sigma_\theta=25.0$ degrees
The stabilization zone was added to the original lens thickness profile.

Figure 6A:
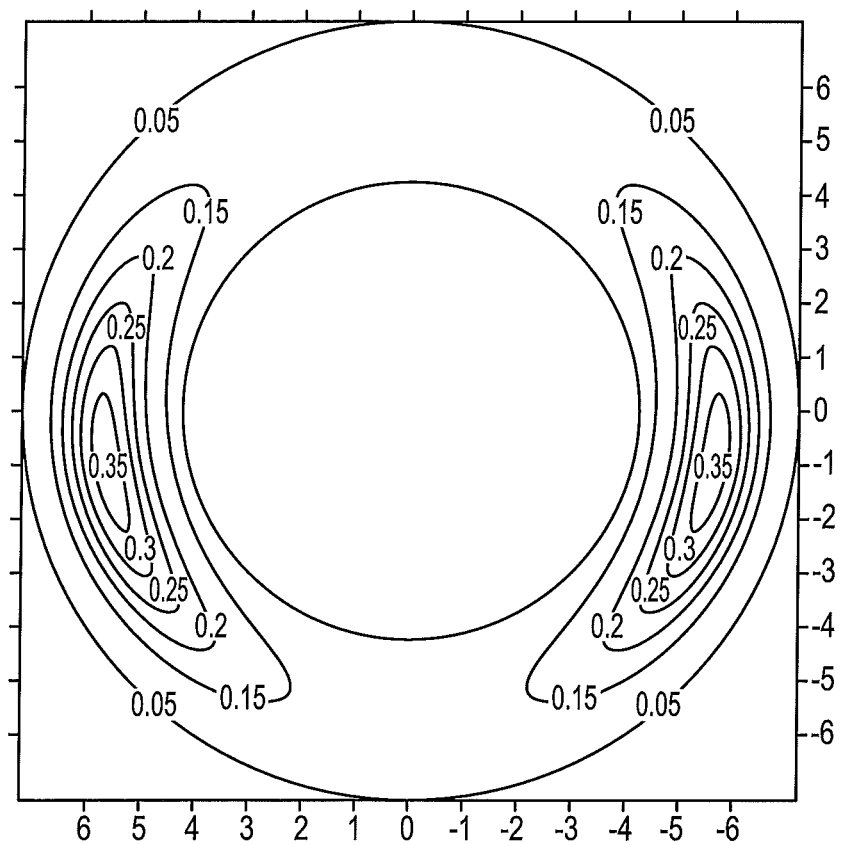
FIGS. 6A-6C illustrate a front view of a stabilized lens with stabilization zones corresponding to example 3 along with corresponding circumferential and radial thicknesses.
Figure 6B:
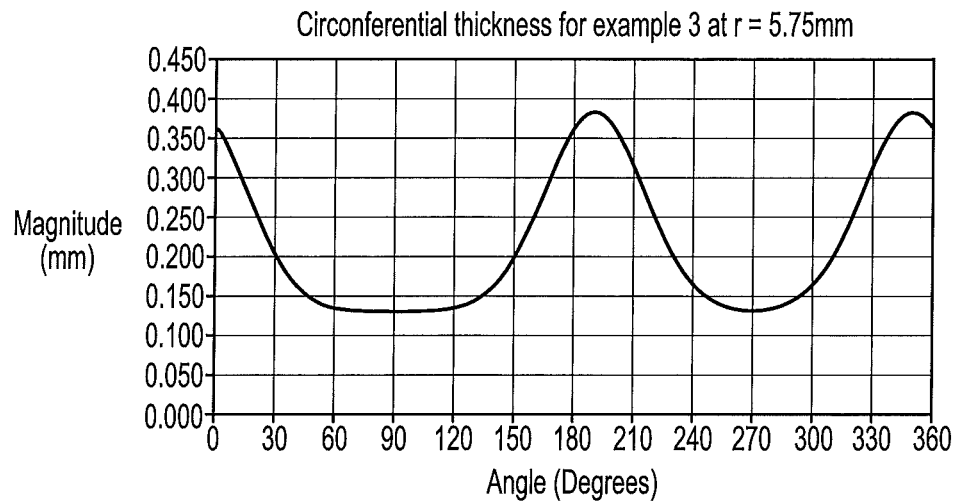
Figure 6C:
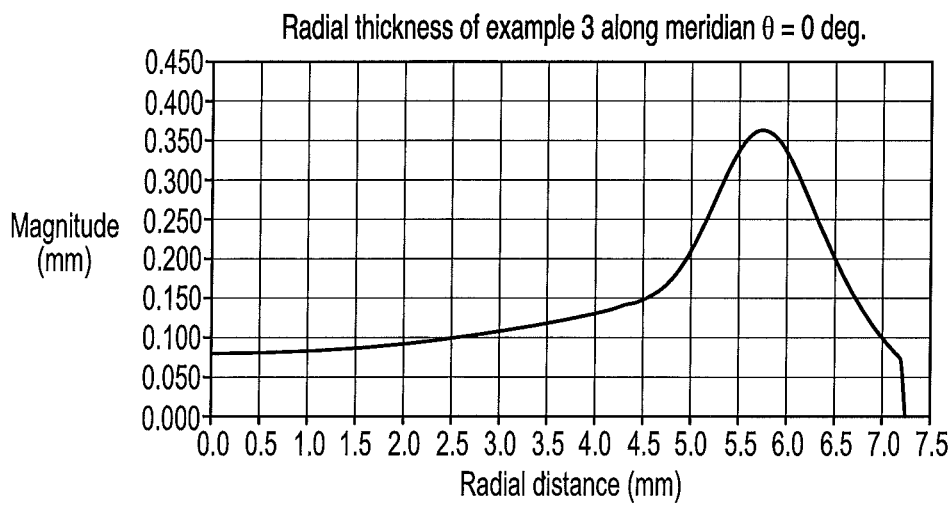

An improved stabilization design was obtained in which the final orientation of the stabilization zone was such that the peak location of the stabilization zone was changed angularly around the 0-180 deg. meridian from the geometrical center of the lens as shown in FIG. 6A along with corresponding circumferential and radial thicknesses as shown in FIGS. 6B and 6C respectively. Stabilization zones are no longer symmetric about the horizontal axis and the rate of change of the slope of those zones differs in direction away from the 0-180 meridian. The final value of the merit function was 0.64. Improvement on the merit function was of the order of 55%. Rotation declined sharply relative to the initial stabilization design. Beginning at blink 4 less than 30 degrees rotation were seen with about 10 degrees of rotation seen at blink 10 and no rotation from blink 16 onward compared to about 40-30-15 degrees of rotation seen in the initial design over the same range of blinks. Centration was less than 0.06 mm on blink 1 and less than 0.04 at blink 4. Thereafter it dropped sharply, being less than 0.02 at 8 blinks and zero at blink 16 relative to greater than 0.06 to greater than 0.07 and greater than 0.08 for the initial design over the same number of blink cycles. This example shows improved rotation, centration and stability as compared with the lens of Example 1.

EXAMPLE 4

Figure 7A:
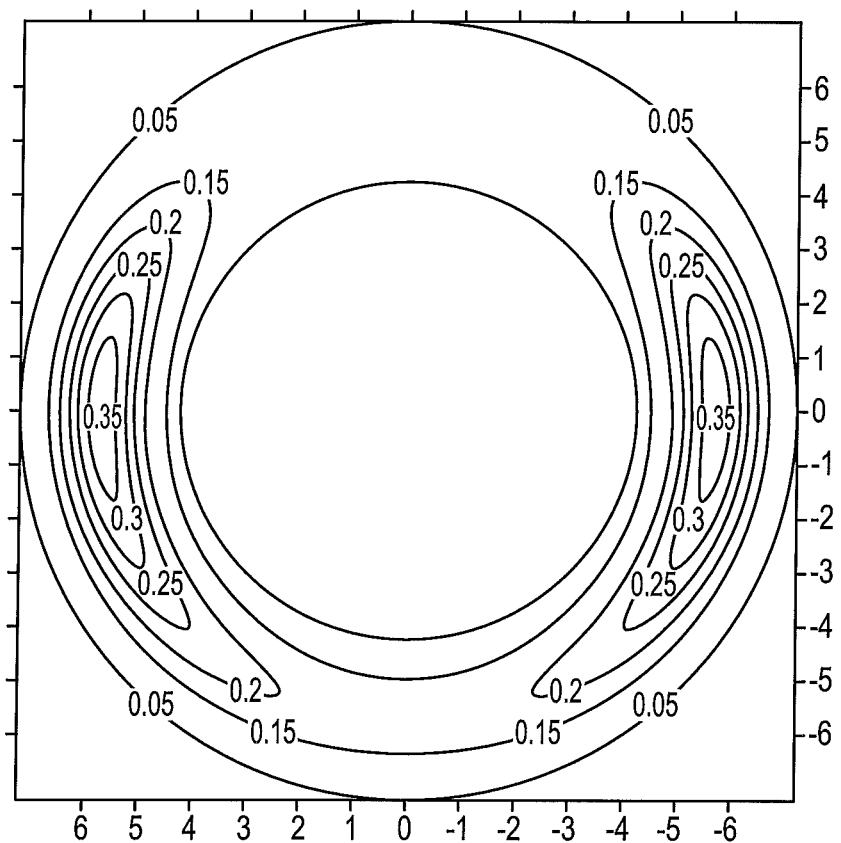
FIGS. 7A-7C illustrate a front view of a stabilized lens with stabilization zones corresponding to example 4 along with corresponding circumferential and radial thicknesses.
Figure 7B:
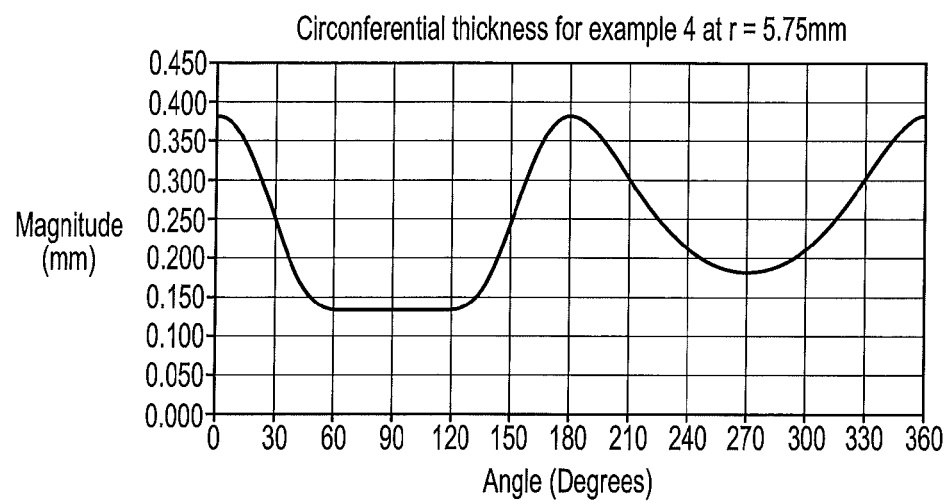
Figure 7C:
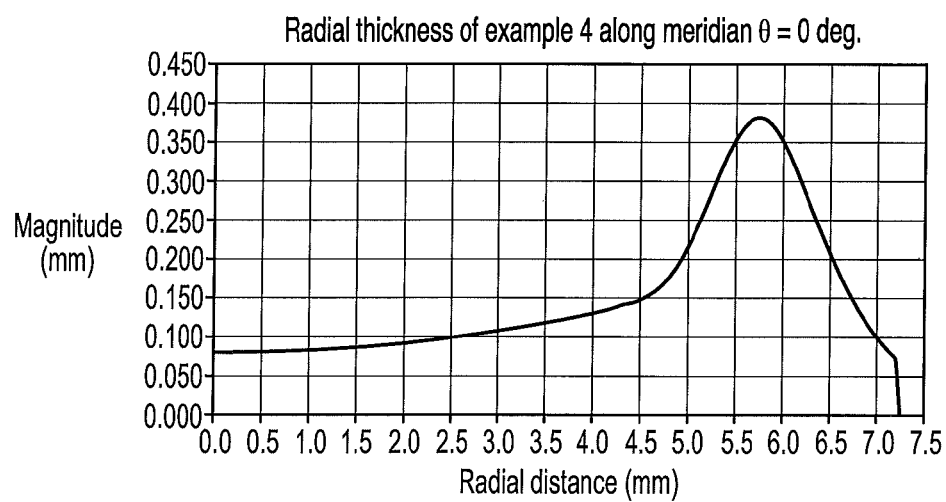

A new stabilization zone was designed using the eye model and optimization method described above and the initial design described in Example 1. The merit function was defined using
  Surface area below the response in rotation.
  Surface area below the response in centration.
  Weight for rotation $W_R=0.84$, weight for centration $W_C=1.14$.
  The values from which the initial stabilization zone were built were:
  $Z_0=0.25$ mm
  $r_0=5.75$ mm
  $\sigma R=0.50$ mm
  $\theta_0=1.954$
  $\sigma_\theta=0.14$
The stabilization zone was added to the original lens thickness profile. The stabilization zone was adjusted to change the slope around the peak location. Peak locations remain on the 0-180 degrees meridian as shown in FIG. 7A along with corresponding circumferential and radial thicknesses as shown in FIGS. 7B and 7C respectively. Stabilization zones are not symmetric about the horizontal axis and the rate of change of the slope of those zones differs in direction away from peak height. This is accentuated in this case with a much more gradual decline in slope toward the bottom portion of the lens. Slope changes were obtained using a log-normal Gauss distribution function for describing angularly the thickness change. The final value of the merit function was 0.86. Improvement on the merit function was of the order of 30%. Rotation declined moderately relative to the initial stabilization design. Beginning at blink 6 less than 30 degrees rotation were seen with about 10 degrees of rotation seen at blink 12 and no rotation from blink 16 onward compared to about 38-30-15 degrees of rotation seen in the initial design over the same range of blinks. Centration was less than 0.08 mm on blink 1 and less than 0.07 at blink 4. Thereafter it dropped sharply, being less than 0.05 at 8 blinks and 0.04 at blink 16 relative to 0.06 to greater than 0.07 and 0.08 for the initial design over the same number of blink cycles. This example shows improved rotation, centration and stability as compared with the lens of Example 1.

Figure 8:
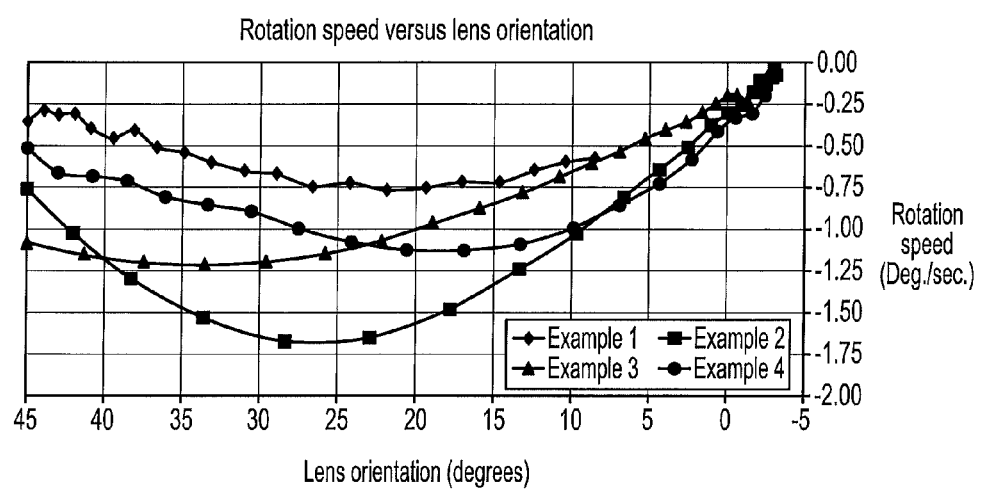
FIG. 8 is a graph showing rotation speed measurements.

FIG. 8 summarizes the rotation speed versus lens orientation on eye for the example 1, 2, 3, and 4. The initial design described in example 1 has an average rotation speed of about −0.55°/sec. in the 45°-0° miss-orientation range, while designs given in examples 2, 3 and 4 have an average rotation speed above −0.70°/sec. within the same miss-orientation range. Example 2 and 4 have higher rotation speed for miss-orientations below 15°. Both designs are more adequate for lenses requiring single orientation on eye such as soft contact lenses designed for high order aberration correction. These designs might require different fitting method requiring special fiducials on the front surface to help the patient for lens insertion. As the lens orientation on eye is unique due to the asymmetry of the stabilization and because of the markings on the front surface, the orientation of the lens during insertion should be very close to the final orientation of the lens after it reaches its resting position. High rotation speed for small miss-orientation at insertion will provide faster full vision correction. Those designs also present better centration performance over the design of example 3. Lens centration gets stable over a smaller number of blinks.

What is claimed is:

1. A contact lens designed with improved stabilization, the contact lens being stabilized by a method comprising: a) providing a lens design with an initial set of stabilization zone parameters, b) applying a merit function to the lens design based on balancing moments of momentum, the merit function including at least one of lens rotation and centration performance, lens stability around a resting position, or lens rotation and centration performance and stability around a resting position, c) creating a contact lens design with improved stabilization based on the application of the merit function to the lens design with an initial set of stabilization zone parameters, and d) conducting steps b and c iteratively over multiple blinking cycles, wherein a virtual model that simulates the effects of eye mechanics is used to determine the contact lens design and blinking is one of the eye mechanics and the simulated effects of blinking is used to adjust the stabilization.

* * * * *